United States Patent
Hwang

(10) Patent No.: US 9,568,650 B2
(45) Date of Patent: Feb. 14, 2017

(54) PRIVACY SECURING FILM

(71) Applicant: SEWHA P&C CO., LTD., Gyeonggi-do (KR)

(72) Inventor: Byoung-Woo Hwang, Gyeonggi-do (KR)

(73) Assignee: SEWHA P&C CO., LTD., Yongin-si, Gyeonggi-do (KR)

(*) Notice: Subject to any disclaimer, the term of this patent is extended or adjusted under 35 U.S.C. 154(b) by 38 days.

(21) Appl. No.: 14/592,189

(22) Filed: Jan. 8, 2015

(65) Prior Publication Data

US 2015/0338558 A1 Nov. 26, 2015

(30) Foreign Application Priority Data

May 26, 2014 (KR) .................. 10-2014-0062861

(51) Int. Cl.
G02B 27/00 (2006.01)
G02B 5/00 (2006.01)
G02B 1/14 (2015.01)

(52) U.S. Cl.
CPC .................. *G02B 5/003* (2013.01); *G02B 1/14* (2015.01); *G02B 27/0018* (2013.01); *G02B 2207/123* (2013.01)

(58) Field of Classification Search
CPC ....... G02B 5/003; G02B 27/0018; G02B 1/14; G02B 2207/123

USPC .................. 359/296, 613, 614, 619
See application file for complete search history.

(56) References Cited

U.S. PATENT DOCUMENTS

| | | | |
|---|---|---|---|
| 2,053,175 A | 9/1936 | Borzykowski | |
| 2,689,387 A | 9/1954 | Carr | |
| 3,524,789 A | 8/1970 | Olsen | |
| 5,104,210 A * | 4/1992 | Tokas | G02B 5/00 359/296 |
| 2006/0103779 A1* | 5/2006 | Amemiya | G02F 1/133524 349/95 |

FOREIGN PATENT DOCUMENTS

| | | |
|---|---|---|
| KR | 10-0500477 B1 | 7/2005 |
| WO | WO 92/11549 | 7/1992 |

* cited by examiner

*Primary Examiner* — William Choi
(74) *Attorney, Agent, or Firm* — Rabin & Berdo, P.C.

(57) ABSTRACT

A privacy securing film comprises a louver film consisting of transparent layers and opaque layers arranged alternately, wherein the opaque layer is made of light-absorbing beads having a mean diameter of 0.2 to 20 micrometers and binder bonding said beads each other and adjacent transparent layers, and being characterized in a micro-roughness formed at the interface between the transparent layer and the opaque layer due to the presence of said beads. The privacy securing film of the present invention has a simplified structure, excellent appearance with a simple manufacturing process as well as reduces the creation of a ghost image significantly, as compared with conventional ones.

7 Claims, 3 Drawing Sheets

PRIVACY SECURING FILM

TECHNICAL FIELD

The present invention relates to a privacy securing film, and more particularly, to a privacy securing film comprising a louver film consisting of transparent layers and opaque layers arranged alternately, wherein the opaque layer is made of light-absorbing beads having a mean diameter of 0.2 to 20 micrometers and binder bonding said beads each other and adjacent transparent layers, and being characterized in a micro-roughness formed at the interface between the transparent layer and the opaque layer due to the presence of said beads.

BACKGROUND ART

A privacy securing film is also referred to as a light control film or the like. The demand for the privacy securing film has increased according to a tendency in taking serious view on each individual private life. Accordingly, many studies on the privacy securing film have been made, mainly for application to a window blind and the like. For example, U.S. Pat. No. 2,053,175 to E. Astima discloses a method of manufacturing a louver film by alternately laminating transparent materials and opaque materials and cutting the laminate vertically. In addition, U.S. Pat. No. 2,689,387 to Carr, W. P. et al. discloses a plastic blind, which is manufactured by alternately arranging transparent films and optical shielding films, bonding them to each other and then cutting the laminate vertically. Further, U.S. Pat. No. 3,524,789 to Olsen, F. O. et al. discloses a method of manufacturing a privacy securing film by slicing a stacked billet. Recently, with the development of display devices such as LCDs, an optically securing film for protecting individual privacy, i.e., for not showing the contents displayed on a display device to others at a certain angle besides, has been increasingly demanded. However, a conventional louver film like disclosed in afore-mentioned articles produces a ghost image, due to a variation in the refraction index of a plastic part at the interface between a transparent portion and an opaque portion, thereby causing a fatigue or tiredness to users giving their attention to a display. Therefore, recent researches on privacy securing films have been focused on reduction in the creation of a ghost image. To reduce the creation of the ghost image, International Publication No. WO 92/11549 discloses a light control film employing a multi-layered louver that comprises high optical absorption layers containing a relatively high content of carbon black and low optical absorption layers containing a relatively low content of carbon black. However, the privacy securing films in the aforementioned documents employ complicated louver structures, which lead to complicated manufacturing processes and high production costs.

In order to overcome the problems of the conventional privacy securing films including above mentioned inventions, we had invented and granted to a Korean patent No. 10-500477 regarding a privacy securing film having a louver film, wherein the louver film is manufactured through a process including the steps of i) alternately laminating and thermo-compressing transparent film layers and opaque adhesive ink layers, and ii) cutting the thermo-compressed, laminated film perpendicularly to or at a certain angle with respect to the surface thereof such that the thickness of the louver film is in a range of 2 to 30 times the thickness of the transparent film, which can be manufactured through a simplified and economically efficient process, while reducing eyestrain through a decrease in surface reflection and also minimizing the creation of a ghost image. The resin contained in the opaque adhesive ink is diffused into some of the adjacent transparent film layers during thermo compression to combine the opaque adhesive ink layers with the transparent film layers, which also allows a part of the pigment of high light absorptivity to be diffused into the transparent film layers along with the resin. As for the reason of the reduction in the creation of a ghost image, the inventor presumed that some part of the opaque adhesive ink is transferred into the transparent film layers during the thermo-compression, and thus, changes in physical and chemical properties such as morphology and reflectivity are caused at the interface between the transparent film layer and the opaque adhesive ink layer, thereby reducing the creation of the ghost image in the privacy securing film.

DISCLOSURE OF INVENTION

Technical Problem

However, the privacy securing film of the above mentioned our Korean patent No. 10-500477 has some shortcomings like relatively long time consuming for prosecuting thermo-compression process for enough bonding of the transparent film layer and opaque adhesive ink layers and adequate physico-chemical changes in the interface therebetween, difficulty in control for micro-roughness formed at the interface between transparent film layers and opaque adhesive ink layers, and lowering quality in appearance.

Therefore, an object of the invention is to provide a privacy securing film having a louver film having simple forming and control over micro-roughness structure at the interface between the transparent layer and opaque layer, appearance enhancement as well as time saving in thermo-compression process.

Technical Solution

In order to achieve these objects, the present invention provides a privacy securing film comprising a louver film consisting of transparent layers and opaque layers arranged alternately, wherein the opaque layer is made of light-absorbing beads having a mean diameter of 0.2 to 20 micrometers and binder bonding said beads each other and adjacent transparent layers, and being characterized in a micro-roughness formed at the interface between the transparent layer and the opaque layer due to the presence of said beads.

Further, the present invention also provides the privacy securing film, wherein the thicknesses of the transparent layer and the opaque layer are preferably 1 to 200 micrometers and 0.2 to 20 micrometers, respectively.

The present invention also provides the privacy securing film further comprising a hard coat layer provided on at least one face of said louver film.

Also provided is a privacy securing film, wherein the light-absorbing bead is an organic or inorganic bead covered with a light-absorbing material.

Further, the present invention provides the privacy securing, wherein the light-absorbing bead and the binder are mixed in ratio of 1:1 to 5 by volume.

Further, the present invention also provides a privacy securing, wherein the thickness of the louver film is in the range of 2 to 30 times the thickness of the transparent layer.

BEST MODE FOR CARRYING OUT THE INVENTION

Hereinafter, the present invention will be described in detail.

Figure 1:
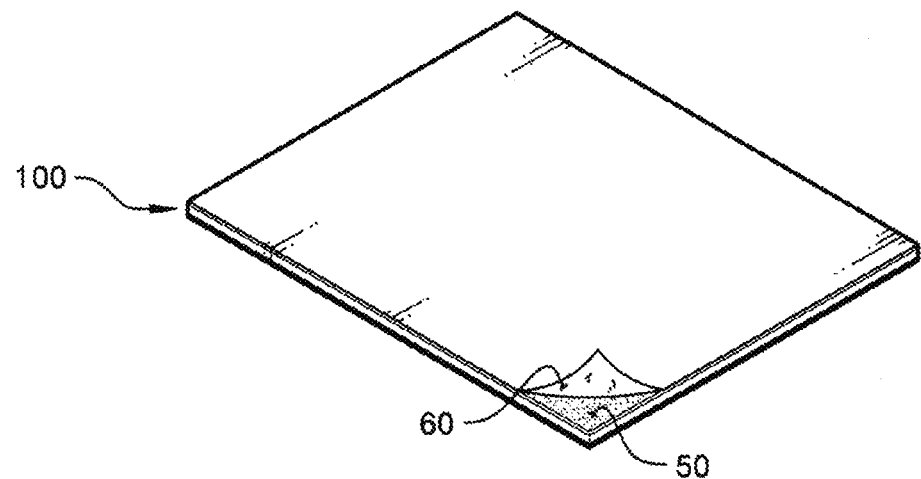
FIG. 1 is a perspective view of a privacy securing film manufactured according to an embodiment of the present invention.
Figure 2:
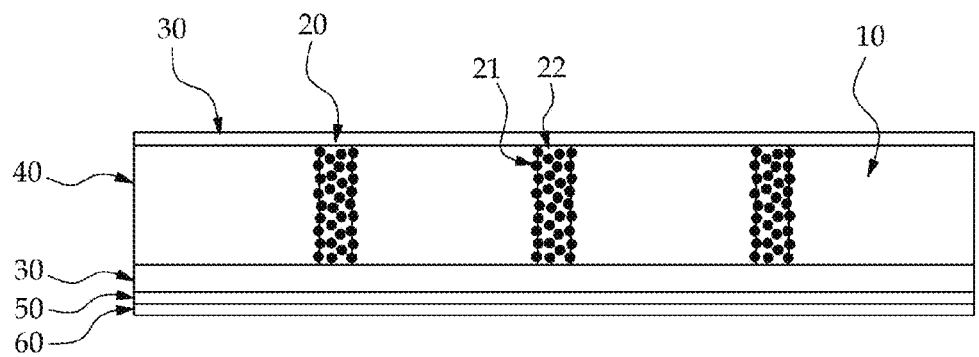
FIG. 2 is a sectional view of the privacy securing film manufactured according to the embodiment of the invention.

FIGS. 1 and 2 are a perspective view and a sectional view of the privacy securing film manufactured according to the embodiment of the present invention, respectively. As shown in FIGS. 1 and 2, a privacy securing film according to the present invention comprises a louver film consisting of transparent layers and opaque layers arranged alternately, wherein the opaque layer is made of light-absorbing beads having a mean diameter of 0.2 to 20 micrometers and a binder bonding said beads each other and adjacent transparent layers, and being characterized in a micro-roughness formed at the interface between the transparent layer and the opaque layer due to the presence of said beads.

A transparent layer according to the present invention could be made of any synthetic or natural resins so far as it has a desired light transmittance when manufactured in the form of a film. Synthetic resin is desirable in view of economical efficiency and processability. Preferred examples of the resin to be used as the material of the transparent film layers include polyvinyl chloride (PVC), polyethylene terephthalate (PET), polyacrylate, polymethyl methacrylate, polyurethane, polycarbonate, polyethylene, polypropylene, cellulose acetate butyrate (CAB), triacetates, polyvinyl alcohols and a copolymer thereof.

The opaque layer comprises a light-absorbing bead of 0.2 to 20 micrometers mean diameter and a binder bonding said light-absorbing beads each other and adjacent transparent layer. The light-absorbing bead in the present invention means a light-absorbing material coated organic and/or inorganic normal bead, such as PMMA, polyacrylate, polyurethane, alumina, zirconia bead, or a bead made of light-absorbing material solely or mixed with other non-light-absorbing material. The light-absorbing bead forms a micro-roughness by itself at the interface between said transparent layer and opaque layer in thermo-compression process, which reduces the formation of a ghost image by absorbing or scattered reflecting light diagonally radiated from a display. The light-absorbing material has a high light absorption and low reflection coefficient so as to prohibiting light reflection. In considering economics, process convenience and light absorption effect, preferred example of the light-absorbing material may be carbon, graphite, graphene or the like, and the preferred coating method on bead may be CVD etc. The size of the light-absorbing bead is preferred in the range of 0.2 to 20 micrometers mean diameter. The visible light is in the range of about 380 to 770 nm wavelength. Therefore, the size of the light-absorbing bead would be optimized for adequate scattered reflection. And for the micro-roughness should be formed at the interface between the transparent layer and opaque layer and according to the shape of the light-absorbing bead, the light-absorbing bead may have the larger hardness than that of transparent layer.

The binder of the present invention is not restricted in physical or chemical characteristic especially, only required as having sufficient bonding strength in binding the beads each other and adjacent transparent layer and lower reflection coefficient than that of the transparent layer. Preferred examples of the binder include acrylic binder, urethane binder and PVC binder, etc. The light-absorbing bead and binder are preferred to be mixed in the ratio of 1:1 to 5 by volume. In case that the mixing ratio is lower than 1 by volume, the bonding strength is too weak to retain louver structure in cutting process. While the mixing ratio is over 5 by volume, the formation of micro-roughness at the interface between the transparent layer and the opaque layer is not sufficient to reduce the ghost image due to relative lack of bead at the interface. The light-absorbing bead and the binder are mixed in adequate solvent so as to make paste.

In the louver film, the thicknesses of the transparent layer and the opaque layer are preferably 1 to 200 micrometers and 0.2 to 20 micrometers, respectively. The thicknesses of the transparent layer and opaque layer are related with the light transmittance and viewing angle of the privacy securing film. If the thickness of the transparent film layer is less than 1 micrometer, the boundary thereof with the opaque layer becomes obscure so that the field of view cannot be easily established. If it is above 200 micrometers, the thickness of the louver film required to obtain a viewing angle becomes significantly thick, thus failing to provide a good economic efficiency and also possibly degrading optical properties such as light transmittance. In addition, if the thickness of the opaque layer is less than 0.2 micrometers, the light shielding capacity becomes deteriorated and the privacy securing film fails to achieve the object of the present invention. If it is above 20 micrometers, the opaque layer comes to have a visible thickness. This is not desirable because the contents displayed on the screen of a display device may be partially hid by the opaque ink layer, or a user can discern the presence of the opaque layer.

The transparent film layer and the opaque layer are alternately laminated and thermo-compressed. As mentioned before, the optical characteristics of the privacy securing film according to the present invention is achieved by the micro-roughness formed at the interface between the transparent layer and opaque layer. The formation of the micro-roughness is accomplished in the course of thermo-compression. During thermo-compression, the transparent layer becomes soften and the light-absorbing beads adjacent to the transparent layer are embedded into the softened tissue of the transparent layer. FIG. 2 is a cross-sectional view of the privacy securing film according to the embodiment of the invention illustrating the structure of the privacy securing film of the present invention. As shown in FIG. 2, the roughness of micro-roughness is determined by the size and the amount of the light-absorbing bead. A producing manager do not need for special quality control for formation of the micro-roughness of the louver film. Except special cases, the thermo-compression process may be performed with the condition of the temperature of between Tg (glass transition temperature) and Tm (melting point) of the transparent layer and the pressure of 0.1 to 150 kgf/cm2. Ideally, the thermo-compression can be performed at one time after the laminated film has been formed to a desired thickness. In order to prevent creation of pores due to entrained air between the layers, it is preferred that a vacuum state be established before and/or during the thermo-compression.

After laminating to a desired thickness by performing lamination of the transparent layers and the opaque layers alternately and the thermo-compression, cutting or continuous rotative slicing process would be performed in order to produce a louver film. The cutting is performed perpendicularly to or at a certain angle with respect to the surface of laminae with the thickness of in a range of 2 to 30 times that of the transparent film layer. If the thickness of the louver film is less than 2 times for that of the transparent film layer, the privacy securing effects become insufficient. While it would be over 30 times the thickness of the transparent film layer, a viewing angle of the film becomes significantly narrow so that a user comes to feel tired soon. Thus, it is preferred that the thickness of the louver film is in the range of 2 to 30 times that of the transparent film.

The privacy securing film of the present invention may be provided with a hard coat layer on at least one face of the louver film. The role of the hard coat layer is to protect the privacy securing film from an external impact as well as maintain the shape of louver film.

An adhesive may be coated on one side of the hard coat layer. An adhesive is preferred as being transparent such as OCA (optically clear adhesive) in order to not deteriorate light transmittance of the privacy securing film.

The present invention will be described below in greater detail in connection with preferred embodiments of the present invention. It should be noted that the following embodiments are provided merely for better understanding of the invention and the scope of the present invention is not limited only to the embodiments.

EMBODIMENT 1

Manufacture of Privacy Securing Film

We prepared a light-absorbing bead by coating carbon on PMMA bead having 6-micrometer mean diameter by CVD. The light-absorbing bead was mixed with adhesive polyurethane resin as binder by 1:1 (vol./vol.) in 8-times of toluene by volume, then paste was prepared. A PVC transparent film 10 of 30 cm×40 cm and has a thickness w of 0.1 mm, was also prepared. The paste was coated on said transparent film via Gravure printing up to 15 micrometers thickness and underwent drying. Then opaque layer coated transparent film was laminated to 130 mm, so that the laminate of the transparent layers 11 and the opaque layers 12 were alternately laminated. Thereafter, thermo-compression was carried out at a temperature of 110° C. under a pressure of 50 kgf/cm2 for 12 hours using a thermo-compressing machine (Model: KH001 available from Korean Engineering, Inc.) and cooled down to room temperature for 24 hours. The laminated film was cut with a thickness of 0.2 mm perpendicularly to the surface thereof using a knife (self-manufactured), to produce a louver film 10.

Hard coat films 30 were attached on both faces of the louver film 10, respectively. One of the hard coat layers 30 was coated with an adhesive 50 and a release paper 60 was attached thereon, thereby completing a privacy securing film 100.

Figure 3:
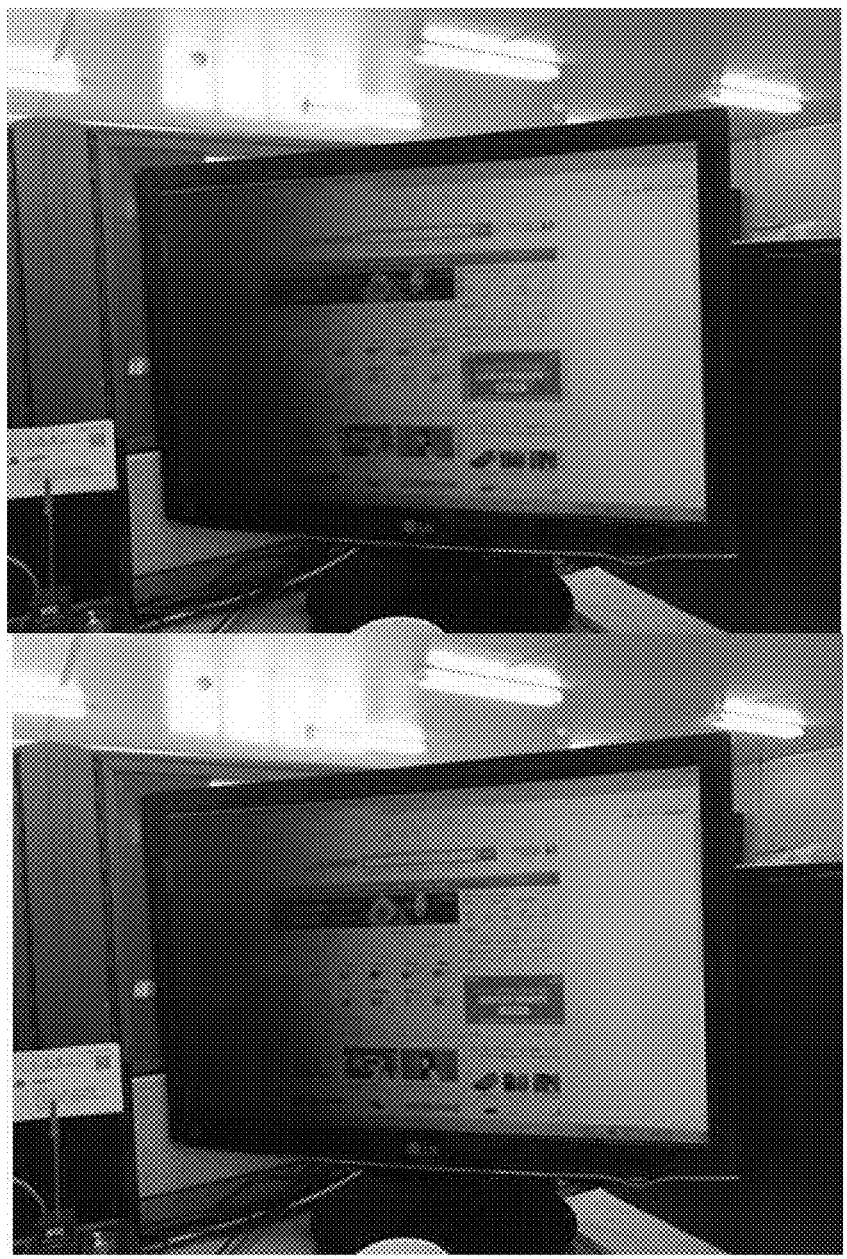
FIG. 3 shows ghost image reduction effect of a privacy securing film according to the present invention (lower) compared with a conventional privacy securing film made of only plastic films (upper).
Figure 4:
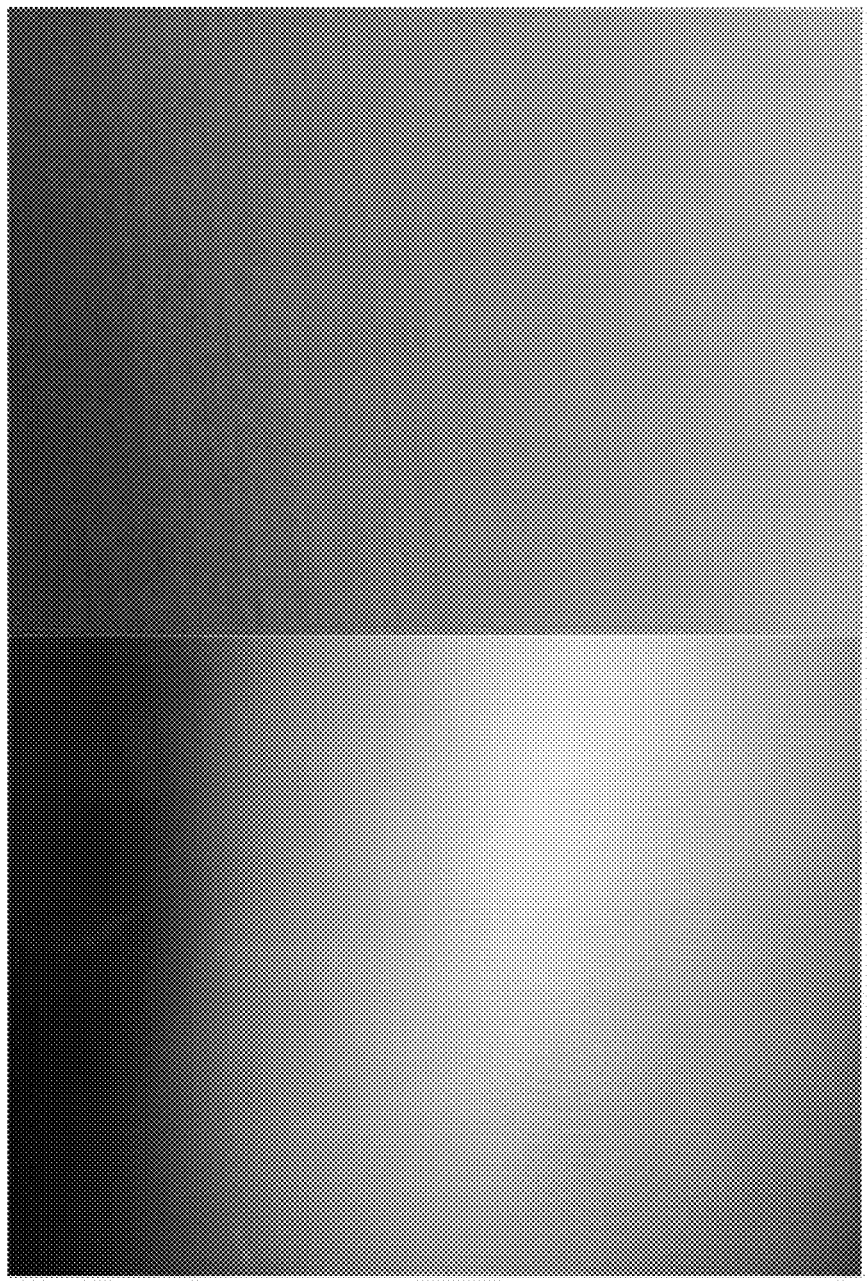
FIG. 4 shows improvement of appearance of a privacy film according to the present invention (lower) compared with that according to the applicant's former Korean Patent No. 10-500477 (upper).

FIG. 3 shows ghost image reduction effect of a privacy securing film according to the present invention compared with a conventional privacy securing film and FIG. 4 shows improvement of appearance of a privacy film according to the present invention (lower) compared with that according to the applicant's former Korean Patent No. 10-500477 (upper), respectively. As shown in FIGS. 3 and 4, the privacy securing film according to the present invention shows excellent optical properties including ghost image reduction and appearance compared with a conventional one.

INDUSTRIAL APPLICABILITY

As described above, the privacy securing film of the present invention has advantages in that it has a simplified structure, can be manufactured through a simple manufacturing process, and can significantly reduce the creation of a ghost image, as compared with conventional ones. The privacy securing film can be applied to a variety of screens of display devices such as CRTs, LCDs and cellular phones to thereby protect private lives of users and also protect the users against harmful electromagnetic waves by means of a radio-shielding component.

It is intended that the embodiments of the present invention described above should not be construed as limiting the technical spirit of the present invention. The scope of the present invention is defined only by the appended claims. Those skilled in the art can make various changes and modifications thereto without departing from the spirit. Therefore, various changes and modifications obvious to those skilled in the art will fall within the scope of the present invention.

What is claimed is:

1. A privacy securing film comprising:
a louver film consisting of transparent layers and opaque layers arranged and laminated alternately in a lengthwise direction of the louver film,
wherein:
each opaque layer is formed as a separation layer that separates two adjacent transparent layers from each other, such that the two adjacent transparent layers are entirely apart and disconnected from each other by a thickness of said each opaque layer interposed therebetween;
each opaque layer is made of light-absorbing beads having a mean diameter of 0.2 to 20 micrometers and a binder bonding said beads each other, the binder being disposed through the entire thickness of each opaque layer; and
an interface is formed between the opaque layers and the transparent layers, the interface includes a first portion at which said beads are in contact with the transparent layers and a second portion at which the binder is in contact with the transparent layers, and a micro-roughness formed at the interface between the transparent layer and the opaque layer due to the presence of said beads.

2. The privacy securing film as claimed in claim 1, wherein the thicknesses of the transparent layer and the opaque layer are preferably 1 to 200 micrometers and 0.2 to 20 micrometers, respectively.

3. The privacy securing film as claimed in claim 1 further comprising a hard coat layer provided on at least one face of said louver film.

4. The privacy securing film as claimed in claim 1, wherein the light-absorbing bead is an organic or inorganic bead covered with a light-absorbing material.

5. The privacy securing film as claimed in claim 1, wherein the light-absorbing bead and the binder are mixed in ratio of 1:1 to 5 by volume.

6. The privacy securing film as claimed in claim 1, wherein the thickness of the louver film is in the range of 2 to 30 times the thickness of the transparent layer.

7. The privacy securing film as claimed in claim 1, wherein a thickness of each transparent layer is 50 to 200 micrometers.

* * * * *